United States Patent [19]

Ditzel et al.

[11] Patent Number: 4,853,889

[45] Date of Patent: Aug. 1, 1989

[54] ARRANGEMENT AND METHOD FOR SPEEDING THE OPERATION OF BRANCH INSTRUCTIONS

[75] Inventors: David R. Ditzel, Watchung; Hubert R. McLellan, Jr., Califon, both of N.J.

[73] Assignee: American Telephone and Telegraph Company, AT&T Bell Laboratories, Murray Hill, N.J.

[21] Appl. No.: 48,210

[22] Filed: May 11, 1987

Related U.S. Application Data

[63] Continuation-in-part of Ser. No. 903,883, Sep. 3, 1986.

[51] Int. Cl.⁴ .............................................. G06F 9/00
[52] U.S. Cl. .................................. 364/900; 364/938
[58] Field of Search .............................. 364/200, 900

[56] References Cited

PUBLICATIONS

"The Architecture of High Performance Computers", by Roland N. Ibbett, Reader in Computer Science, Univ. of Manchester, Springer-Verlag New York Inc.
"A Processor for a High-Performance Personal Computer", by B. W. Lampson and K. A. Pier, XEROX Palo Alto Research Center, Palo Alto, CA 94304.
"An Instruction Fetch Unit for a High-Performance Personal Computer", by B. W. Lampson, G. A. Mc-Daniel and S. M. Ornstein, XEROX Palo Alto Research Center, Palo Alto, CA 94304.

Primary Examiner—Gareth D. Shaw
Assistant Examiner—John G. Mills
Attorney, Agent, or Firm—Jerry W. Herndon; Robert O. Nimtz

[57] ABSTRACT

Arrangement and method for avoiding the processing time associated with executing branch instructions in a computer. An instruction fetch unit appends a next instruction address field to each instruction it passes it via an instruction cache to an instruction execution unit. The fetch unit decodes the present instruction being read and the next sequential instruction in main memory. If neither instruction is a branch instruction, the next address field is set to the address of the next sequential instruction. If the present instruction is a branch, the next instruction address field is set to the branch address contained in the present instruction. If neither of these cases are true and the next sequential instruction from main memory is a branch, the next instruction address field is set to the branch address of this instruction. The execution unit uses the next instruction address to access instructions from the instruction cache. Thus, execution of branch instructions by the execution unit are avoided.

3 Claims, 1 Drawing Sheet

ARRANGEMENT AND METHOD FOR SPEEDING THE OPERATION OF BRANCH INSTRUCTIONS

This application is a continuation of application having Ser. No. 903,883 filed Sept. 3, 1986, now abandoned.

TECHNICAL FIELD

This invention relates to the architecture of digital computers and, more particularly, to the implementation of efficient program transfers known also as branch, or jump, instructions.

BACKGROUND OF THE INVENTION

Digital computers retrieve instructions and data from a memory device and execute the instructions in accordance with a program stored therein. The computer's repertoire of instructions comprises operational instructions, control instructions or some combination thereof. Operational instructions perform some direct arithmetic or logical function. Control instructions direct the order of execution of instructions. Computer instructions are executed sequentially, usually, as they are found in the computer's memory. Control instructions alter this otherwise sequential flow of execution.

The address of the instruction currently being executed is kept in a machine register, usually known as program counter. As a current instruction is being executed, the next program counter value is generated to address the logically following instruction. If the current instruction is an operational instruction, this next program counter value is the address of the sequential instruction in memory. If the current instruction is a control instruction, the next program counter value is the target address specified by the operand of the control instruction. The speed with which this next program counter value can be generated affects overall computer performance.

SUMMARY OF THE INVENTION

In accordance with the illustrative embodiment of the present invention, the time required for executing branch instructions is significantly reduced by dynamically appending a next instruction address field to instructions in an instruction fetch unit after the instructions are fetched from memory but before they are transferred via an instruction cache to an execution unit. The next instruction address field in the instruction cache obviates the need for the execution unit to recalculate the address of the next logically sequential instruction after transferring the current instruction from the instruction cache to the execution unit.

The use of a next instruction address field permits the elimination of branch instructions as sequential instructions by inserting the address of the target of a branch instruction as the next instruction address field of the sequentially previous instruction. This eliminates the separate branch instruction from the instruction cache and allows the execution unit to fetch the target instruction while executing the sequentially previous instruction.

DETAILED DESCRIPTION

Figure 1:
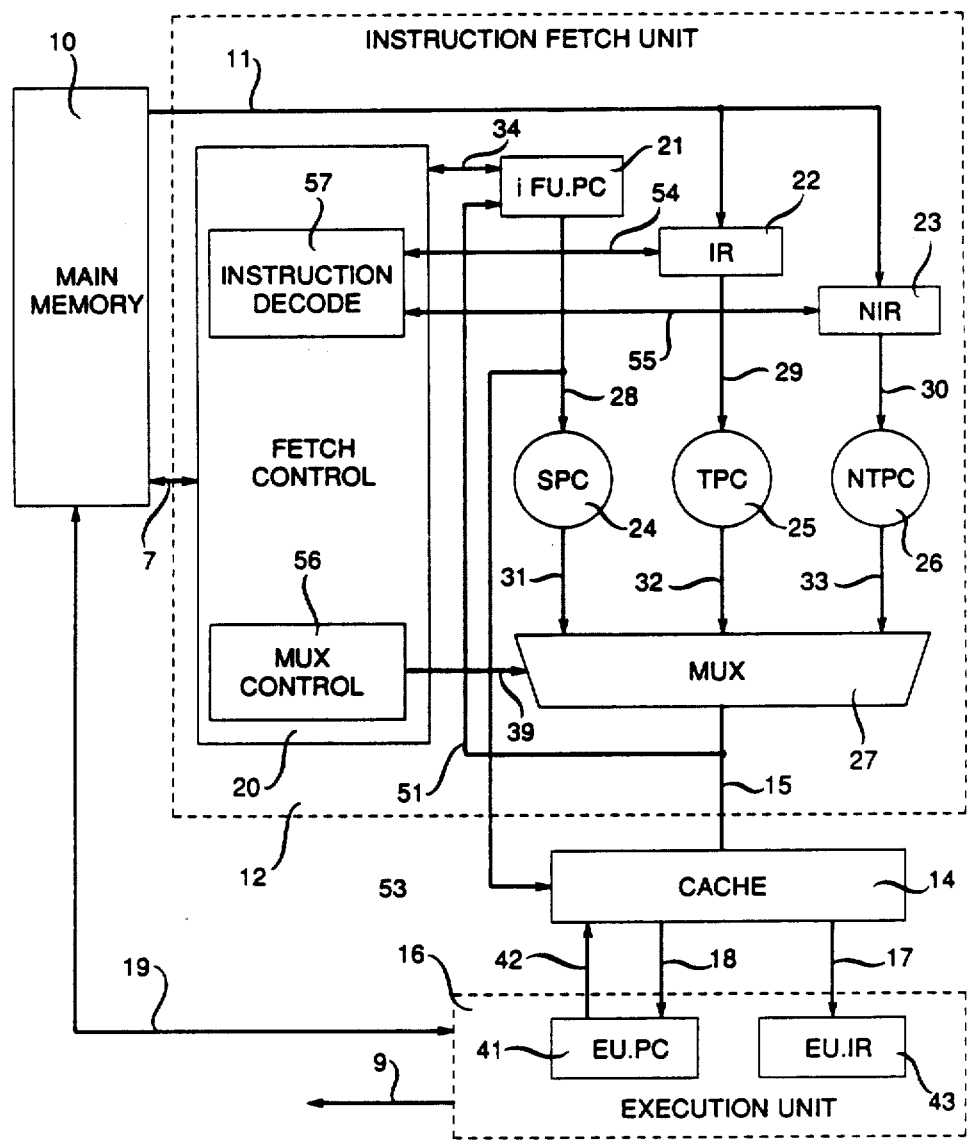
FIG. 1 is a block diagram revealing relevant parts of a general purpose digital computer organized to take advantage of the present invention.

Referring to FIG. 1, there is shown a block diagram of a general purpose digital computer which is useful in realizing the advantages of the present invention. The digital computer of FIG. 1 comprises a main memory 10 which stores both data and instructions. Instructions are fetched from memory 10 by instruction fetch unit 12 and stored in instruction cache memory 14. In accordance with the present invention, instruction fetch unit 12 also generates a next instruction address and transfers the next instruction address to cache 14 over bus 15.

Cache 14 comprises a traditional computer memory cache, that is, a high speed buffer. Cache 14 is modified to provide extra storage space for the next instruction address. Instructions to be executed are transferred from cache 14 over bus 17 to execution unit 16. Data operands for instructions being executed are then transferred from main memory 10 over bus 19 to execution unit 16. Main memory 10, execution unit 16, and cache 14 operate in a traditional fashion and may be implemented in any one of several ways commonly employed by those skilled in the art. The output from execution unit 16 is transferred over bus 19 to main memory 10 or over bus 9 to a utilization means (not shown).

Referring, more particularly, to instruction fetch unit 12, there is shown the instruction fetch unit's program counter (IFU.PC) 21. The instruction fetch unit's program counter 21 holds the address of the instruction to be fetched. Under the direction of fetch control circuit 20, which may be a finite state machine or which may comprise conventional combinational logic, an instruction is fetched from main memory 10 over bus 11 and placed in instruction register (IR) 22. The sequentially following instruction is also fetched from main memory 10 and placed in next instruction register (NIR) 23.

In accordance with the present invention, three potential next program counter values are calculated. The sequential program counter circuit (SPC) 24 operates on the contents of instruction fetch unit's program counter 21 to produce the address of the next sequential instruction. This address is transferred via bus 31 to multiplexer 27. Target program counter circuit (TPC) 25 operates on the contents of instruction register 22 to product the target address of a potential branch instruction which is transferred via bus 32 to multiplexer 27. Next instruction target program counter circuit (NTPC) 26 is similar to TPC 25 and operates on the contents of next instruction register 23 to produce the target address of a potential branch instruction which is transferred via bus 33 to multiplexer 27.

Fetch control 20 includes control circuitry 56 which controls the operation of multiplexer 27 via bus 39 thereby generating the next value of the instruction fetch unit's program counter 21 and the next instruction address field of cache 14. Contents of instruction register 22 and next instruction register 23 are transferred to fetch control 20 via busses 54 and 55, respectively. Branch and non-branch instructions are recognized by their bit patterns by decoding circuitry 57. If instruction register 22 has a branch instruction, then fetch control 20 signals multiplexer 27 via control bus 39 to select the contents in target program counter 25 as the next instruction address. If instruction register 22 has an operational instruction and next instruction register 23 has a non-branch instruction, then fetch control 20 signals multiplexer 27 via bus 39 to select the contents of sequential program counter 24 as the next instruction address. In the situation where instruction register 22 has an operational instruction and the instruction stored in next instruction register 23 is a branch, however, fetch control 20 signals multiplexer 27 via control bus 39 to select the contents of next target program counter 26 as the next instruction address.

As part of the operations of instruction fetch unit 12, the next instruction address field and the contents of instruction register 22 are placed in instruction cache 14 at the location specified by instruction fetch unit's program counter 21. The value of counter 21 is sent to the cache via bus 53. The address of the instruction is Entries of instruction cache 14, thus, comprise an instruction and the address of the next instruction to be executed and are stored in the cache at locations corresponding to the contents of iFU.PC 21.

Execution unit 16 addresses instructions in cache 14 by the execution unit's program counter (EU.PC) 41 via bus 42. The cache entry thereby addressed is transferred to execution unit 16. The next instruction address field of cache entry is transferred via bus 18 to the execution unit's program counter 41 simultaneously with an instruction via bus 17 to the execution unit's instruction register (EU.IR) 43.

Because each cache entry has both an instruction and the address of the next instruction to be executed, execution unit 16 can readily retrieve the next instruction from cache 14 without additional computational delay. Furthermore, because the next instruction address field of cache 14 may have been generated from a branch instruction in next instruction register 23 via next target program counter circuit 26, and the instruction portion of cache 14 may have an operational instruction from instruction register 22, execution unit 16 will execute both such instructions simultaneously. Thus, branch instructions are not actually executed. By this means, the separate execution time required for a branch instruction is eliminated.

The present invention can be understood more clearly by referring to the following set of instructions:

| Address Number | Instruction |
| --- | --- |
| 1 | MOV A,B |
| 2 | ADD C,D |
| 3 | JMP 37 |

Initially, address number 1 is entered in instruction fetch unit's program counter register 21. Thereafter, instruction "MOV A,B" is read from main memory 10 and entered in instruction register 22. The next sequential instruction, namely, "ADD C,D" is read from main memory 10 and entered in next instruction register 23. Because the instruction entered in next instruction register 23 is not a branch, the address of the next sequential instruction, namely 2, is computed by sequential program counter 24. Thereafter, the instruction in register 22 and next address field from MUX 27 are transferred simultaneously to instruction cache 14 at a cache address specified by data from the iFU.PC 21 on bus 53, as stated hereinabove. The instruction entered in cache 14 appears as at cache address 1 follows:

| Instruction | Next Address Field |
| --- | --- |
| MOV A,B | 2 |

Subsequently, the instruction address 2 is entered in program counter 21 via bus 51. Instruction 2, namely, "ADD C,D" is retrieved from main memory 10 and entered in instruction register 22. The next sequential instruction, namely, "JMP 37" is retrieved from main memory 10 and entered in next instruction register 23. Because instruction register 22 holds an operational instruction and next instruction register 23 holds a branch instruction, determined to be so by fetch control 20, the target of the branch, namely "37" is transferred from next target program counter 26 to instruction cache 14 and to iFU.PC 21 via bus 51 to cause IFU 12 to subsequently fetch the instruction at memory 10 address 37, along with the instruction from register 22. Thus, the instruction in cache 14 appears at cache address 2 as follows:

| Instruction | Next Address Field |
| --- | --- |
| ADD C,D | 37 |

By this means, the separate execution time that would otherwise be expended by execution unit 16 for retrieving instruction 3, namely "JMP 37", from instruction cache 14 and associated time used by execution unit 16 is eliminated.

What is claimed is:

1. A computer for reducing the execution time required for branch instructions, said computer comprising a main memory,
an instruction fetch unit for fetching instructions from said main memory,
an instruction cache for storing instructions for execution, and
an execution unit for executing the instructions stored in the instruction cache,
said instruction fetch unit comprising
first means for storing a first address of a first instruction,
second means for storing said first instruction,
third means for storing a second instruction sequentially following the first instruction in the main memory,
generating means, responsive to the contents of said first, second and third means, for generating a second address of an instruction to be executed following the first instruction, said second address being that of the second instruction if neither the first and second instructions are branch instructions, a branch address specified by the first instruction if the first instruction is a branch instruction, or a branch address specified by the second instruction if the first instruction is a nonbranch instruction and the second instruction is a branch instruction,
means for transferring the first instruction and the second address for storage in said instruction cache, and
means in the execution unit for addressing the instruction cache at the second address after addressing the first instruction to obtain the next instruction for execution.

2. The computer of claim 1 wherein the execution unit further comprises
an instruction register and an address register for receiving the first instruction and the address of the second instruction, respectively, from the instruction cache, wherein the contents of the address register addresses the instruction cache to fetch the next instruction for execution from the instruction cache.

3. The computer of claim 2 wherein the instruction fetch unit further comprises means for transferring the second address to the first means to maintain address synchronization between the instruction fetch unit and the execution unit.

* * * * *